US007826684B2

(12) United States Patent
Yu et al.

(10) Patent No.: US 7,826,684 B2
(45) Date of Patent: Nov. 2, 2010

(54) OPTIMIZATION AND VIEW DEPENDENCY REDUCTION FOR PROCESSING SLICE-BASED VOLUMES

(75) Inventors: Daphne Yu, Yardley, PA (US); Robert Schneider, Roβtal (DE)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 915 days.

(21) Appl. No.: 11/337,772

(22) Filed: Jan. 23, 2006

(65) Prior Publication Data

US 2007/0065001 A1 Mar. 22, 2007

Related U.S. Application Data

(60) Provisional application No. 60/719,125, filed on Sep. 21, 2005.

(51) Int. Cl.
*G06K 9/32* (2006.01)
(52) U.S. Cl. .................. 382/294; 382/154; 382/131
(58) Field of Classification Search ............ 382/131, 382/154, 294; 345/620
See application file for complete search history.

(56) References Cited

U.S. PATENT DOCUMENTS

| 4,984,157 | A * | 1/1991 | Cline et al. ................. 345/424 |
| 6,072,497 | A * | 6/2000 | Lichtenbelt et al. ......... 345/424 |
| 6,178,220 | B1 * | 1/2001 | Freundlich et al. ............. 378/4 |
| 6,196,715 | B1 * | 3/2001 | Nambu et al. ............... 378/197 |
| 6,283,918 | B1 * | 9/2001 | Kanda et al. ................ 600/441 |
| 6,413,219 | B1 * | 7/2002 | Avila et al. .................. 600/443 |
| 6,597,756 | B1 * | 7/2003 | Basu et al. .................... 378/15 |
| 6,680,735 | B1 * | 1/2004 | Seiler et al. ................. 345/424 |
| 6,687,393 | B1 * | 2/2004 | Skinner, Jr. ................. 382/131 |
| 7,003,175 | B2 * | 2/2006 | Paladini ....................... 382/276 |
| 7,301,535 | B2 * | 11/2007 | Shen ........................... 345/424 |
| 7,369,693 | B2 * | 5/2008 | Shen ........................... 382/128 |

(Continued)

FOREIGN PATENT DOCUMENTS

WO          WO 0163561          *   8/2001

OTHER PUBLICATIONS

Philippe et al. "Fast Volum Rendering Using a Shear-Warp Factorization of the Viewing Transformation", ACM 1994, p. 451-458.*

(Continued)

*Primary Examiner*—Brian Q Le
*Assistant Examiner*—Mekonen Bekele
(74) *Attorney, Agent, or Firm*—Donald B. Paschburg (57) ABSTRACT

This invention describes an optimization and view dependency reduction method for multiplanar reformatting (MPR) of slice-based volume images. This method utilizes a traversal scheme that allows for efficient access of the computer memory layout of a sliced based volume, and therefore optimizes overall processing time. This method does not require changes to the volume memory layout or additional volume memory. Instead, efficient memory access is achieved by adaptive traversal patterns on the reformatting planes. The traversal pattern is adapted on-the-fly during rendering as the reformatting plane location and orientation is changed arbitrarily relative to the volume. In this way, the typical speed differences between various reformatting planes orientations caused by inefficient memory access is greatly reduced. Computer cache coherency, SIMD coherent implementation, and multiprocessing environments are also considered in the design of the traversal pattern.

20 Claims, 7 Drawing Sheets

U.S. PATENT DOCUMENTS

| | | | |
|---|---|---|---|
| 7,379,576 B2* | 5/2008 | Shen et al. | 382/131 |
| 2002/0097459 A1* | 7/2002 | Hart | 359/35 |
| 2003/0016403 A1* | 1/2003 | Carlson et al. | 358/505 |
| 2003/0055328 A1 | 3/2003 | Paladini | |
| 2004/0196483 A1* | 10/2004 | Jacobsen | 358/1.13 |
| 2007/0296740 A1* | 12/2007 | Yu et al. | 345/684 |

OTHER PUBLICATIONS

Gabor t Herman, "Display of Three-Dimensional Information in Computed Tomography",Journal of Computer Assisted Tomography, Publication 1977, pp. 155-160.*

Rhodes michael, "Extracting Oblique Planes from Serial CT Sections", Journal of Computer Assisted Tomography: Volume and Issue No. 4 #5, Publication Date: Oct. 1980, pp. 649-657.*

Grim, Soren , et al., "Memory Efficient Acceleration Structures and Techniques for CPU-based Volume Raycasting of Large Data", *Proceedings IEEE/SIGGRAPH Symposium on Volume Visualization and Graphics*, (Oct. 2004),1-18.

Knitel, Gunter , "The ULTRAVIS system", *Proceedings of the 2000 IEEE symposium on Volume visualization, Symposium on Volume Visualization*, Published by ACM Press, New York, NY, USA,(2000),71-79.

Mora, Benjamin , et al., "A new object-order ray-casting algorithm", *Proceedings of the conference on Visualization*, Published by IEEE Computer Society, Washington, DC, USA,(Oct. 27, 2002),203-210.

Wolff;Computer Aided Analysis of MR Brain Images; Published by Kgs. Lyngby 2001 Eksamensprojekt Nr. Aug. 2001, IMM (PP Seiten i-xiii, 5-11, 17-26, 51-54, 93, 94); Magazine.

* cited by examiner

OPTIMIZATION AND VIEW DEPENDENCY REDUCTION FOR PROCESSING SLICE-BASED VOLUMES

CROSS-REFERENCE TO RELATED APPLICATIONS

This application claims the benefit of U.S. Provisional Application No. 60/719,125, filed Sep. 21, 2005, which is incorporated herein by reference.

BACKGROUND OF THE INVENTION

Multiplanar reformatting is a method commonly known in the art for extracting a 2 dimensional (2D) composite image representing the intersection of one or more reformatting planes and a 3 dimensional (3D) volumetric image. It is a widely and routinely used method for viewing and evaluating 3D slice-based medical images and therefore requires maximal speed for fast interactivity. MPR is a special utilization of a more general technique known in the art as volume rendering.

Similarly, related work in volume rendering is also applicable to MPR. Over the years, various optimization techniques to volume rendering had been proposed. Whereas this invention focuses on memory access efficiency for slice based volumes, the focus of most of these previously described optimization techniques had focused on methods to preprocess data, to skip processing of unnecessary data, or in improvement of graphics hardware utilization. These methods do not address the latency that is caused by the inefficient memory access and cache misses. Besides, most of these techniques can still be use in conjunction with the proposed method described in this invention. A few previously described methods do address the memory access efficiency and cache misses. See, (1) S. Grimm, S. Bruckner, A. Kanitsar, E. Groller "*Memory Efficient Acceleration Structures and Techniques for CPU-based Volume Raycasting of Large Data*", Proceedings IEEE/SIGGRAPH Symposium on Volume Visualization and Graphics, pages 1-8. October 2004; (2) B. Mora, J. Jessel, R. Caubet. 'A New Object Order Raycasting algorithm', In Proceedings of IEEE Visualization, pp 107-113, 2002; and (3) G. Knittel 'The Ultravis system' In Proceedings of the IEEE Symposium on Volume Visualization pp 71-79, 2000.

The method described by Knittel, however, requires a spread memory layout which requires additional memory up to four times the original volume data that is not acceptable for large input volumes. In the methods described by Grimm et al. and by Mora et al, a change of the sliced-based volume to a bricked volume memory layout is proposed. This is also not a practical approach since the input volume is usually read-only and this change would require an additional large volume allocation.

SUMMARY OF THE INVENTION

The present invention provides systems and methods for processing images having an input volume and one or more reformatting plane.

The method includes determining the intersection boundary between the volume and the reformatting plane; determining one or more scanlines to be processed based on the intersection boundary; selecting a processing pattern based on an alignment between the volume and the plane; and processing the volume in accordance with the processing pattern to generate an output image. In accordance with a further aspect of the present invention, the method also includes displaying the output image.

In accordance with another aspect of the present invention, the method is performed with a system having multiple processors, and includes the steps of determining the length of each of the one or more scanlines; assigning each of the one or more scanlines to a thread to create one or more threads for processing; and assigning each of the one or more threads to one of the plurality of processors in accordance with the length of the scanlines. It is preferred that the total length of the scanlines in each of the threads assigned to one of the plurality of processors is approximately equal.

In accordance with a further aspect of the present invention, the processing pattern follows each of the one or more scanlines if a memory layout of the input volume and the reformatting plane are approximately aligned and the processing pattern follows a part of each of the one or more scanlines in succession if the input volume and the reformatting plane are not approximately aligned.

If the input volume and the reformatting plane are not approximately aligned, then the processing pattern follows one of two patterns that approximately follows the memory layout of the volume. It is further preferred that the processing pattern is selected from two or more patterns such that the processing pattern follows the alignment of a volume scanline.

In accordance with a further aspect of the present invention, a plurality of reformatting planes are processed and each of the plurality of reformatting planes are traversed independently when a memory layout of the volume is approximately parallel to the plurality of reformatting planes. In this case, it is preferred that the plurality of reformatting planes are traversed in an interleaved pattern when a memory layout of the volume is not parallel to a memory layout of the plurality of reformatting planes.

In accordance with yet another aspect of the present invention, the step of determining one or more scanlines to be processed based on the intersection boundary further includes the following steps: finding a first scanline and volume intersection; checking an intersection status of the next scanline; if an object is inside, then finding the next intersection to be searched in a direction away from the object; and if the object is not inside, then finding the next intersection to be searched in a direction towards the object.

DESCRIPTION OF A PREFERRED EMBODIMENT

Figure 1:
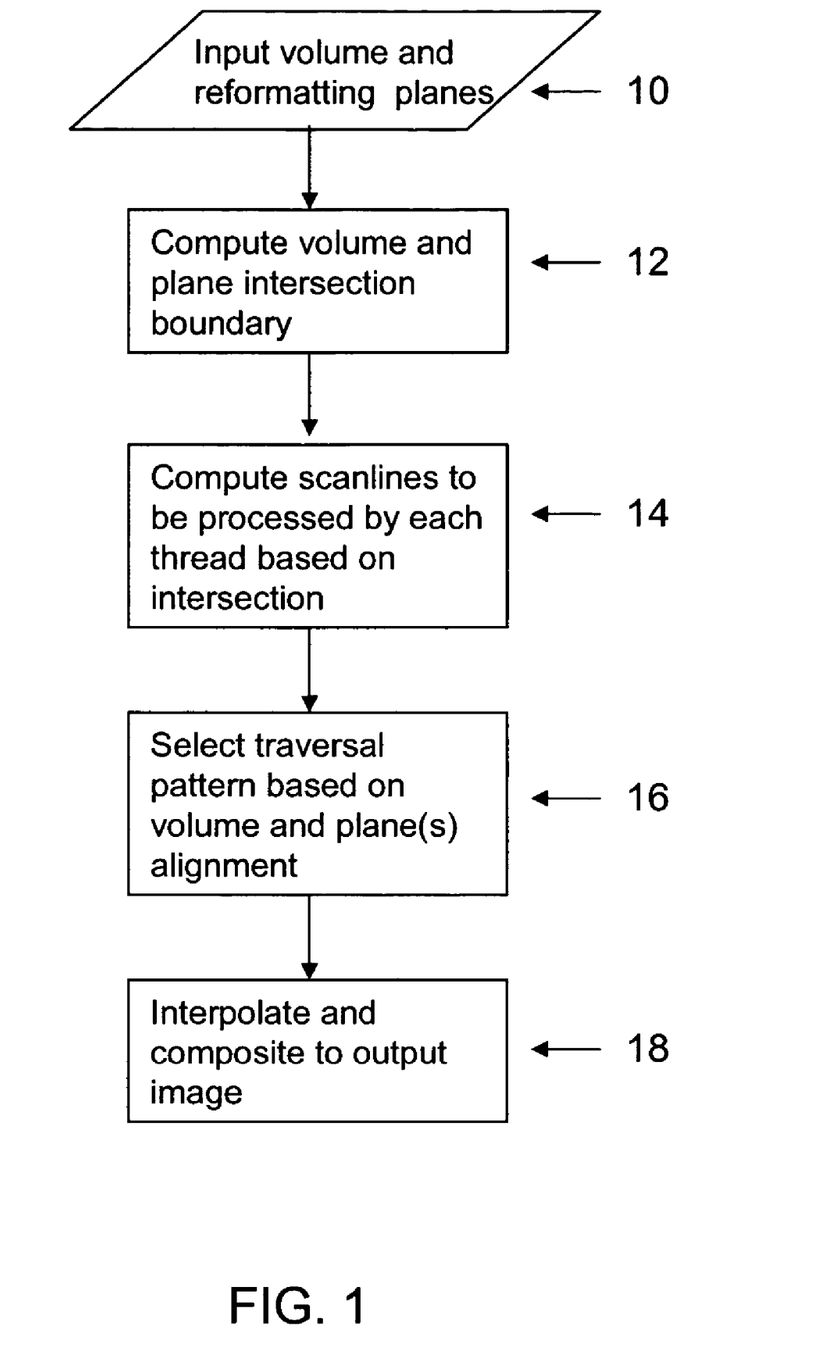
FIG. 1 illustrates a method in accordance with one aspect of the present invention.

A method for efficient traversal of slice-based volume memory for high quality multiplanar reformatting is described herein. This method allows for highly efficient processing and reduces the influence of viewing direction on speed performance by the following steps. 1) The volume intersection boundary is located within each reformatting plane as start and end pairs along each scanline in the reformatting plane. 2) The length of the volume intersection along each scanline is used for balancing load across multiple CPUs. 3) A traversal pattern is selected adaptively based on the relations between the plane and volume orientation. 4) The samples on the planes are computed and composited to the desired final image. This procedure is illustrated in FIG. 1.

Figure 2:
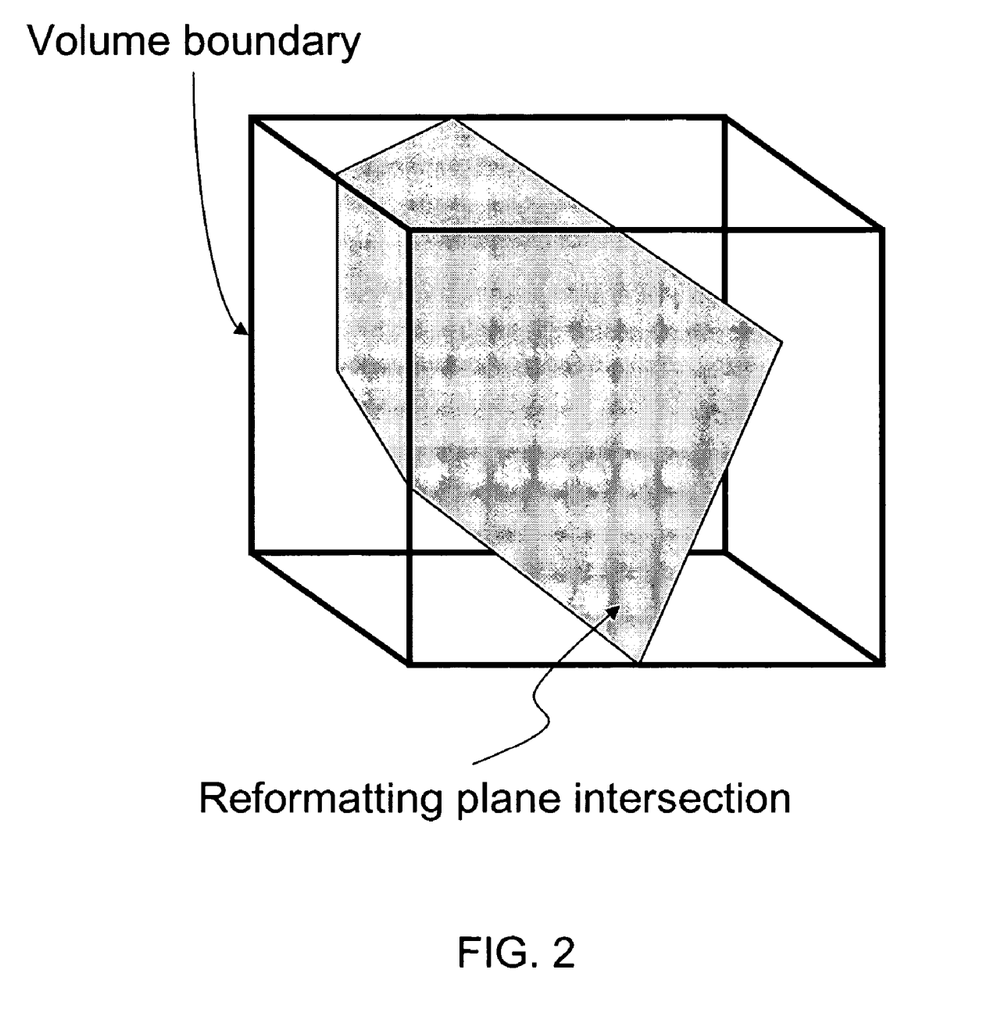
FIG. 2 illustrates one case of the intersection between a volume and a single reformatting plane.

In the first step 10, the input volume and reformatting planes are input from a memory associated with a processor. In the next step 12, the intersection boundary between the volume and the reformatting plane is determined. Such an intersection is illustrated in FIG. 2.

In the next step 14, a localized volume boundary search method is used for computing the volume edge start and end locations within each reformatting plane scanline. The localized volume boundary search method starts by a conventional computation for the first reformatting plane scanline that intersects with the volume object. When the first scanline containing the volume boundary is detected, subsequent adjacent scanlines are traversed only in the local region around each start and end points of the last adjacent boundary. Since the volume boundary, as well as many regularly shaped clipping such as crop box and clip planes, intersects the plane with piece-wise linear edges, whenever possible, the localized boundary search method further exploits this linearity. By comparing the intersection status of the previous scanline intersection and the status of the same location in the current scanline, the search method determines the most likely direction for the intersection of the current scanline. For example, for the start point, if the same scanline location of the current scanline is outside of the volume object, whereas the same location of the previous scanline is within the object, then the most likely intersection of the volume and the current scanline is along the forward direction along the current scanline. Hence, the search method will first search along the forward direction and is likely to find the intersection within a few scanline samples. A similar logic can be used to increase the speed of the search for the intersection end point.

Figure 3:
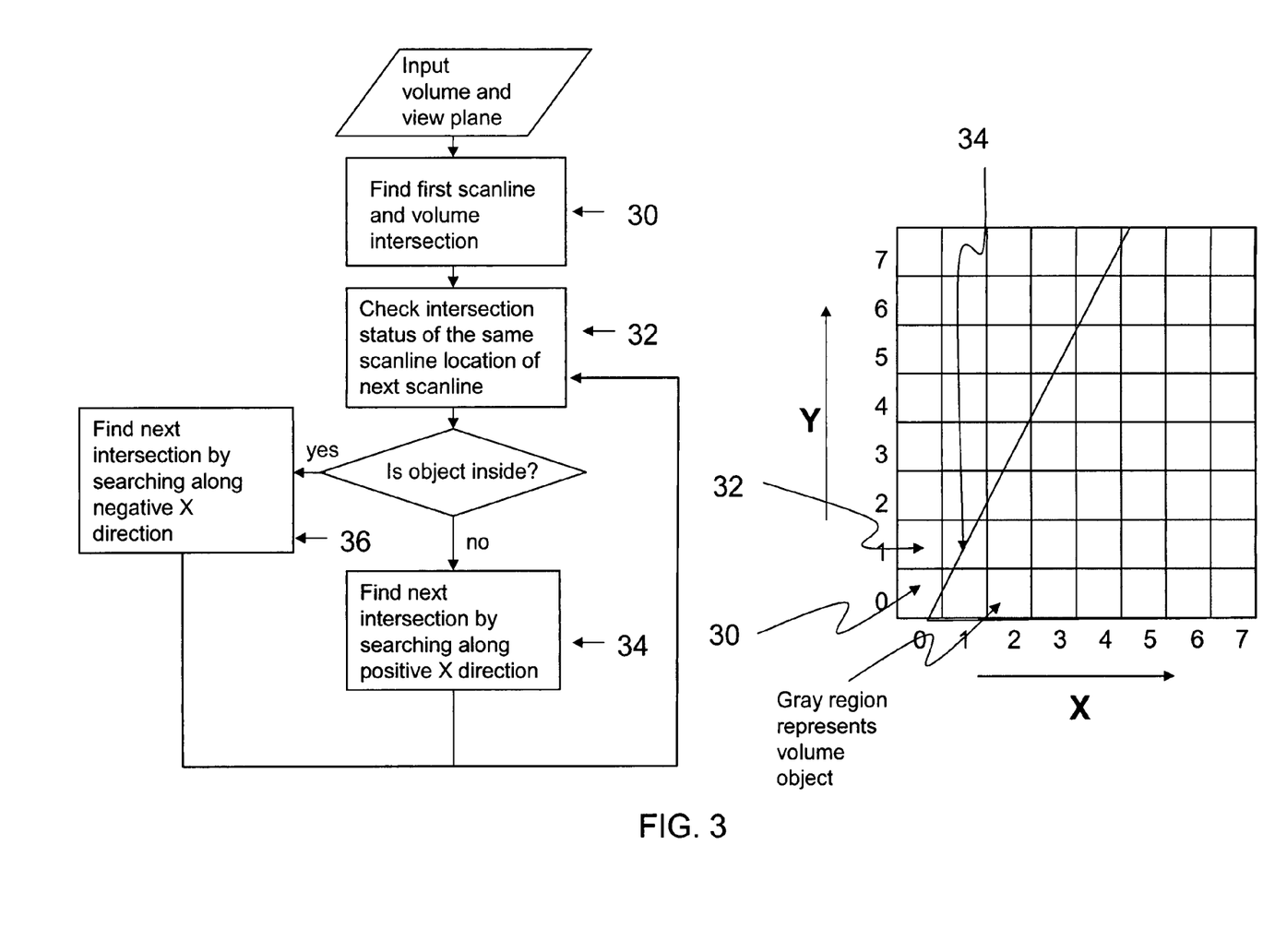
FIG. 3 illustrates a localized search for volume boundaries in a reformatting plane in accordance with one aspect of the present invention.

The decision process of this determination is illustrated in FIG. 3. To accelerate subsequent processing, two start-end pairs can also be computed for each scanline using this localized object boundary search. One pair defines the outer boundary of the plane and the volume intersection. The second pair defines the intersecting region that is not adjacent to the volume border. With this separation of the inner region from the borders, the inner region can be processed in an efficient implementation without the necessity for code branching for border handling. This is beneficial to any subsequent implementation but particularly beneficial for implementation using SIMD coherent processing implementation where multiple scanline samples are processed together.

Figure 4:
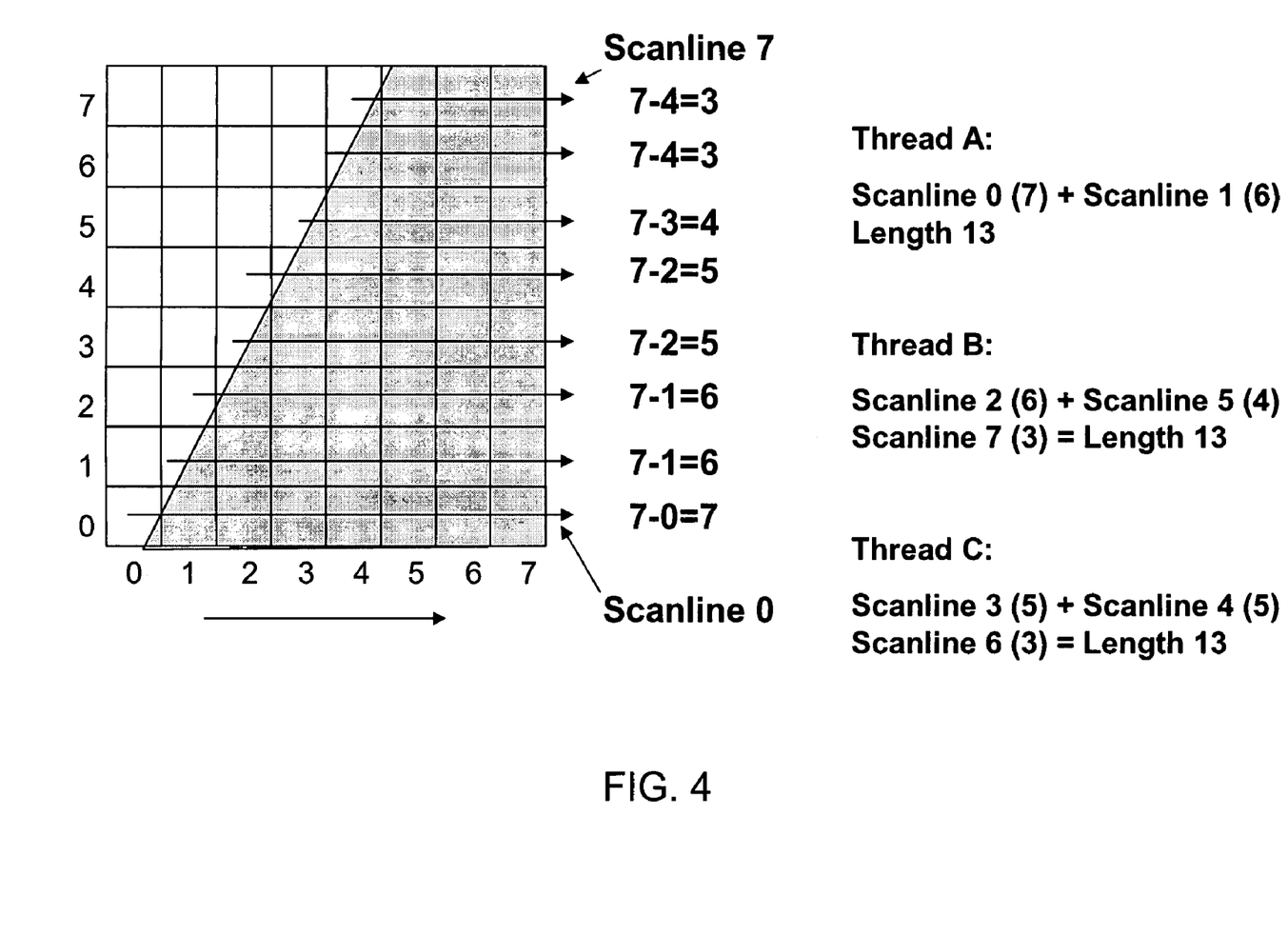
FIG. 4 illustrates a method for balancing CPU processing loads in a multi-processor system in accordance with another aspect of the present invention.

The computation of the volume intersection is also important in a multi-processor environment where different sections of the reformatting planes can be processed by different CPUs. However, simple division of the planes into equal sized processing regions without consideration of the location of the volume in the reformatting planes is not desirable for optimal load balancing across CPUs. The pre-computed intersection information nicely provides the size information required to segment the reformatting plane across processing threads based on precisely the total number of scanline samples that needs to be processed. Specifically, the sum of all differences between each start-end pair will provide the total number of scanline pixels in the planes that intersect the volume. Each processing thread can then be assigned to process a number of scanlines in the planes that closely approximates the average of total pixels across the provided number of processing threads. This load balancing scheme is illustrated in FIG. 4. This method had shown to be effective in improving the CPU utilization and improve the overall speed performance.

Referring back to FIG. 1, in step 16, a traversal pattern for processing is selected based on the alignment of the memory associated with the volume and the reformatting plane. The selection of a traversal pattern optimized in accordance with the memory alignment significantly improves processing speeds.

It is far more important to access the 3D volume memory efficiently than to access the 2D reformatting planes memory efficiently due to the potentially large size of the volume. When voxels in the large volume are randomly accessed, not only does each voxel get fetched multiple times unnecessarily, memory thrashing may also occur when the data does not fit into the computer main memory. For this reason, conventional approaches in computing the MPR by a scanline-by-scanline traversal on the reformatting planes is only optimal when the reformatting plane scanline is aligned with the volume scanlines and the planes are parallel with the volume slices. When this condition is not true, such as when the planes are rotated, the scanline-by-scanline traversal of the planes would result in a random access of the volume. The result is a highly view-dependent speed performance.

Figure 5:
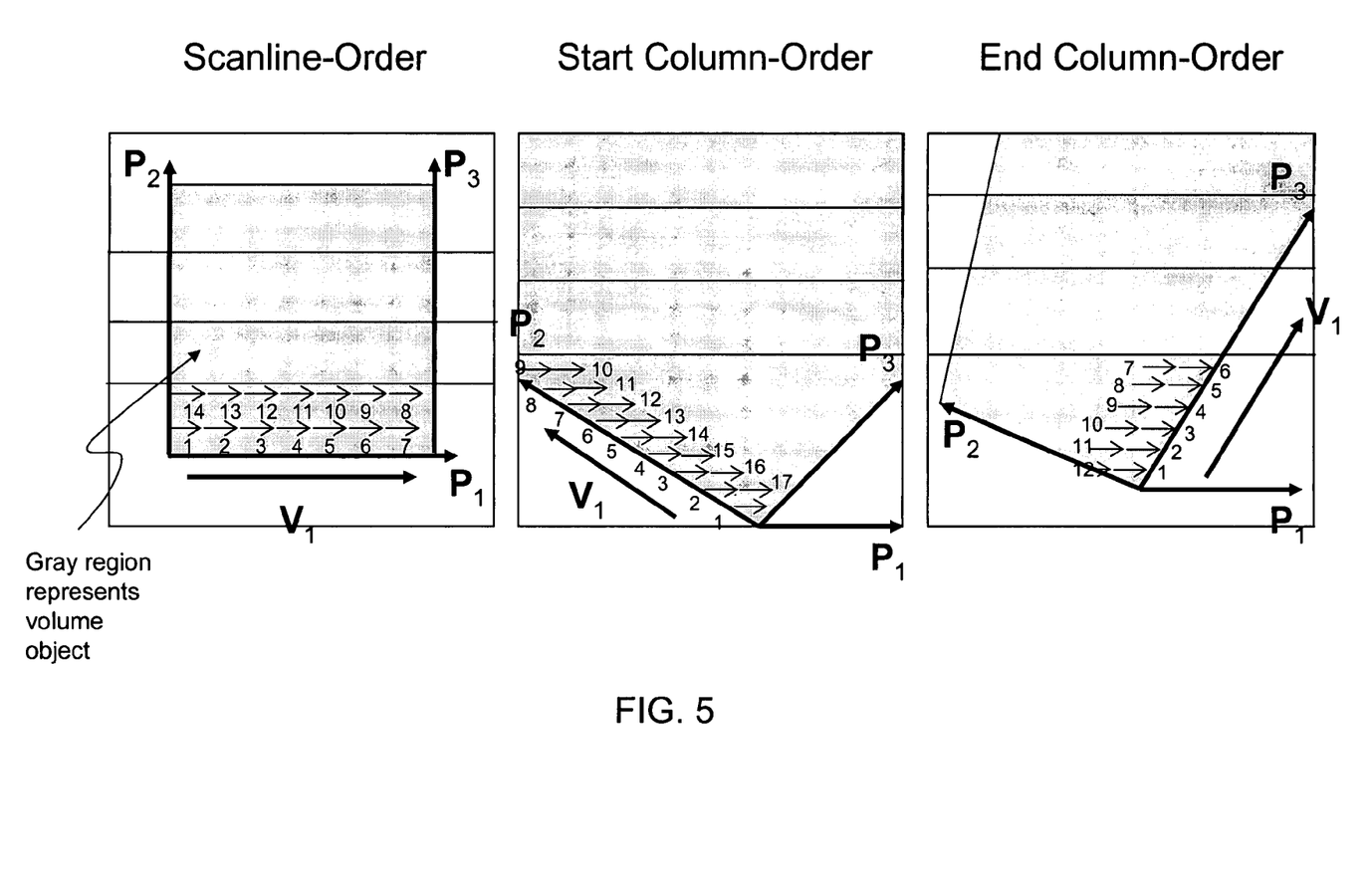
FIG. 5 illustrates traversal patterns for single reformatting plane in accordance with one aspect of the present invention.

Rather than requiring an often impractical change to volume memory layout to accommodate for the scanline-by-scanline traversal, as proposed in prior methods, we propose to adapt the reformatting plane traversal to the volume memory layout. This is achieved by adaptively selecting a traversal pattern within each processing region based on the relationship between the plane scanline direction and the volume orientation. The processing region is a selected portion of the reformatting plane that intersects with the volume. This can be, but is not limited to, the intersecting plane scanlines within each processing thread. Only a few traversal patterns are necessary to effectively reduce view-dependency due to incoherent memory access and cache misses. In the case of a single reformatting plane, we choose from three traversal patterns. These are illustrated in FIG. 5. One can describe a traversal pattern as selecting a predefined order within the processing region that the fragments within it should follow. This order is shown in FIG. 5 as sequence numbers adjacent to the fragments (shown as small arrows). A fragment here represents N number of plane samples that is being processed sequentially along a scanline, where $N>=1$. The choice of N can be based on efficient processing of the samples based on the particular implementation and the size of the computer L1 cache. For a SIMD coherent implementation, for example, one may choose N to be a number that is suitable for the nature of the SIMD processing register sizes to fit the appropriate number of samples.

The selection of which traversal pattern to use is determined by comparing the relationship between following unit vectors:

P1=plane scanline direction
P2=start position of scanline 2−start position of scanline 1
P3=end position of scanline 2−end position of scanline 1
V1=volume scanline direction Specifically, a 'scanline-ordered' traversal that processes all fragments within each processing scanline before proceeding to the next scanline in the plane is selected if $$|P1 \cdot V1| >= |P2 \cdot V1| \text{ and } |P1 \cdot V1| >= |P3 \cdot V1|$$

A 'start column-order' traversal is selected if $$|P2 \cdot V1| >= |P1 \cdot V1| \text{ and } |P2 \cdot V1| >= |P3 \cdot V1|$$

This traversal begins from the starting location of each scanline, processes one fragment and proceeds to the next fragment in the next scanline. This continues until it reaches the last scanline in the processing region, then returns to the next fragment within each scanline, and so on and so forth.

An 'end column-order' traversal is similar to the start column order except it begins at the last fragment of the first scanline, then proceeds to the last fragment of the next scanline. This traversal is selected if $$|P3 \cdot V1| >= |P1 \cdot V1| \text{ and } |P3 \cdot V1| >= |P2 \cdot V1|$$

Intuitively, these selection criteria simply pick the traversal direction out of the three that is the most aligned with the volume scanline, and hence, memory layout of the volume. Furthermore, notice that the traversal switches direction when it reaches the end of the process region. This further localizes the region of plane processed in sequence; therefore maximizes the reuse of the voxels that have been fetched, and minimizes unnecessary duplicate fetches.

Figure 6:
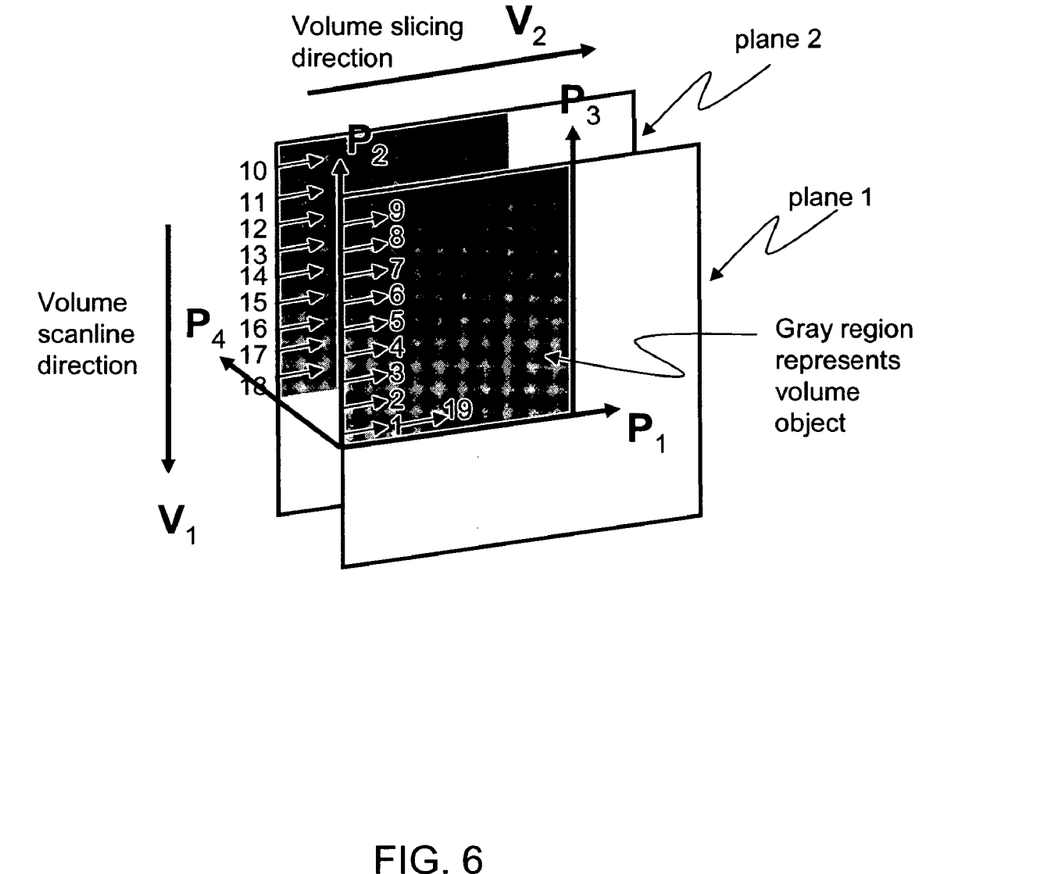
FIG. 6 illustrates a traversal order for multiple reformatting planes in accordance with a further aspect of the present invention.

For multiple reformatting planes, two additional unit vectors are used for comparison.

P4=plane normal direction
V2=volume slicing direction

If $|P4 \cdot V1| < \epsilon$, where $\epsilon$ is a small empirical threshold, then the planes will be traversed independently from each other using one of the patterns for the single plane traversal described above. Otherwise, the fragments of the multiple planes are processed together, meaning that when the fragment within a plane reaches the end of the region, it will proceed to the next fragment in the next plane. An example of this with only two planes shown is illustrated in FIG. 6. In this way, the planes are processed independently only if the volume slicing is highly parallel to the reformatting planes, in which case each plane is already staying within the same volume slices as much as possible. Otherwise, the volume slices span across the planes and it is best to process the planes in an interleaved traversal pattern.

In the last step of the procedure, in step 18, with the traversal pattern selected, all volume samples within the reformatting planes are computed as it is being traversed. Finally, all the volume samples are composited to the desired effect using conventional methods known in the art. The adaptive fragment traversal method had shown to be effective in reducing view dependent performance behaviors. In the viewing directions where the traditional scanline-by-scanline plane traversal would cause the volume to be swapped in and out of the computer memory, the adaptive patterns proposed here have shown to be able to be an effective method to reduce the speed differences between viewing directions. In some viewing directions, it had shown to double the computation speed. Furthermore, this approach is far simpler than any of the previously proposed methods, without other drawbacks since it has no additional memory overhead.

Thus, one aspect of the present invention provides efficient and localized volume and view plane, intersection boundary search methods, improved utilization of the object and view plane intersection size for load balancing across multiple CPUs, and adaptive fragment traversal of the object within the reformatting planes for view-dependency reduction and compositing of one or more viewing planes to form the final image. The present invention also provides methods to reduce the search time and region for regularly clipped volumes and division of inner and outer boundary zones for branch reduction in subsequent processing steps. The present invention further provides efficient processing of reformatting plane and volume intersection while minimizing inefficient code branching. The present invention also provides scanline-order, start column-order and end column-order traversal patterns for single reformatting plane processing as well as traversal patterns that consider multiple CPU processing environments. The present invention also provides for the automatic adaptation of traversal patterns with the ability to automatically select between independent and intermixed plane processing.

The following references provide background information relevant to the present invention, and each of these references is hereby incorporated by reference: (1) S. Grimm, S. Bruckner, A. Kanitsar, E. Groller "*Memory Efficient Acceleration Structures and Techniques for CPU-based Volume Raycasting of Large Data*", Proceedings EEE/SIGGRAPH Symposium on Volume Visualization and Graphics, pages 1-8. October 2004; (2) B. Mora, J. Jessel, R. Caubet. 'A New Object Order Ray-casting algorithm', In Proceedings of EEE Visualization, pp 107-113, 2002; and (3) G. Knittel "The Ultravis system" In Proceedings of the IEEE Symposium on Volume Visualization pp 71-79, 2000.

The described optimization in this invention can also be adapted to more general volume rendering use cases.

Figure 7:
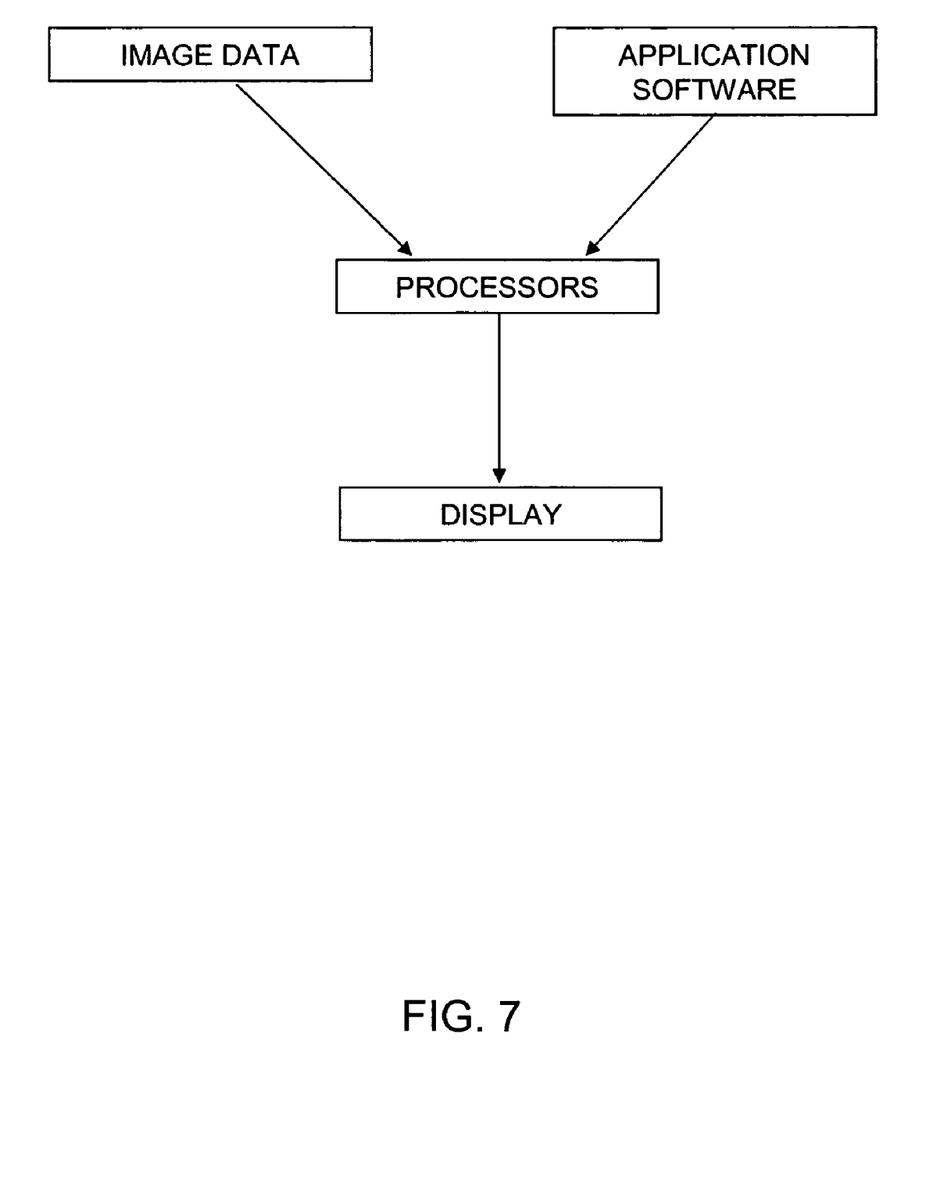
FIG. 7 illustrates a system in accordance with one aspect of the present invention.

Referring to FIG. 7, a system on which the previously described method can be implemented is described. The system includes memory for the image date and application software. The image data and the application software can be loaded onto a processor. The processor can be a personal computer, a workstation computer, a multi-processor system or any other computing system. A display is connected to the processor for receiving an image generated by the processor and to be displayed.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method of processing of images having an input volume and one or more reformatting planes, comprising:
   determining an intersection boundary between the input volume and the one or more reformatting planes;
   determining one or more scanlines to be processed based on the intersection boundary;
   selecting to traverse the one or more reformatting planes by scanlines by column order or by row order, the selection of column order or row order being determined based on an alignment between the volume and the one or more reformatting planes; and
   processing the input volume by a processor in accordance with the selected scanline traversal pattern to generate an output image on a display.

2. The method as claimed in claim 1, wherein the processing of the scanlines is distributed in a system having a plurality of processors, further comprising the steps of:
determining a length of each of the one or more scanlines;
assigning each of the one or more scanlines to a thread to create one or more threads for processing; and
assigning each of the one or more threads to one of the plurality of processors in accordance with the length of the scanlines.

3. The method as claimed in claim 2, wherein a total length of the scanlines in each of the threads assigned to one of the plurality of processors is approximately equal.

4. The method as claimed in claim 1, wherein the selected traversal pattern follows each of the one or more scanlines in the reformatting plane if a memory layout of the input volume and the reformatting plane are approximately aligned and the selected traversal pattern follows a part of each of the one or more scanlines in the reformatting plane in succession if the input volume and the reformatting plane are not approximately aligned.

5. The method as claimed in claim 4, wherein to traverse the plane by column order or by row order is selected if the input volume and the reformatting plane are not approximately aligned.

6. The method as claimed in claim 1, wherein the traversal pattern is selected from two or more patterns such that the selected traversal pattern of the reformatting plane follows the alignment of a volume scanline.

7. The method as claimed in claim 1, wherein a plurality of reformatting planes is processed and each of the plurality of reformatting planes is traversed independently when a memory layout of the volume is approximately parallel to the plurality of reformatting planes.

8. The method as claimed in claim 1, wherein a plurality of reformatting planes is processed and each of the plurality of reformatting planes is traversed in an interleaved pattern when a memory layout of the volume is not parallel to a memory layout of the plurality of reformatting planes.

9. The method as claimed in claim 1, wherein the step of determining one or more reformatting plane scanlines to be processed based on the intersection boundary further includes:
finding a first reformatting plane scanline sample and volume intersection;
checking an intersection status of the next adjacent reformatting plane scanline;
if the next reformatting plane scanline sample is inside a volume object, then finding the next sample intersection by searching in a direction away from the object; and
if the next reformatting plane scanline sample is not inside the volume object, then finding the next intersection by searching in a direction towards the object.

10. A system of processing images having an input volume and one or more reformatting planes, comprising:
one or more processors;
memory in communication with the one or more processors;
application software operable on the one or more processors, the application software:
determining an intersection boundary between the input volume and the one or more reformatting planes;
determining one or more scanlines to be processed based on the intersection boundary;
selecting to traverse the one or more reformatting planes by scanlines by column order or by row order, the selection of column order or row order determined based on an alignment between the volume and the one or more reformatting planes; and
processing the volume in accordance with the selected scanline traversal pattern to generate an output image.

11. The system as claimed in claim 10, further comprising a display in communication with the processor, the display being able to display the output image.

12. The system as claimed in claim 10, there being more than one processor to process the scanlines, wherein the application software is operable to:
determine a length of each of the one or more scanlines;
assign each of the one or more scanlines to a thread to create one or more threads for processing; and
assign each of the one or more threads to one of the plurality of processors in accordance with the length of the scanlines.

13. The system as claimed in claim 12, wherein a total length of the scanlines in each of the threads assigned to one of the plurality of processors is approximately equal.

14. The system as claimed in claim 10, wherein the selected traversal pattern follows each of the one or more scanlines in the reformatting plane if a memory layout of the input volume and the reformatting plane are approximately aligned and the selected traversal pattern follows a part of each of the one or more scanlines in the reformatting plane in succession if the input volume and the reformatting plane are not approximately aligned.

15. The system as claimed in claim 14, wherein to traverse the plane by column order or by row order is selected if the input volume and the reformatting plane are not approximately aligned.

16. The system as claimed in claim 10, wherein the traversal pattern is selected from two or more patterns such that the selected traversal pattern of the reformatting plane follows the alignment of a volume scanline.

17. The system as claimed in claim 10, wherein a plurality of reformatting planes is processed and each of the plurality of reformatting planes are traversed independently when a memory layout of the volume is approximately parallel to the plurality of reformatting planes.

18. The system as claimed in claim 10, wherein a plurality of reformatting planes is processed and each of the plurality of reformatting planes is traversed in an interleaved pattern when a memory layout of the volume is not parallel to a memory layout of the plurality of reformatting planes.

19. The system as claimed in claim 10, wherein the application software, when determining the one or more reformatting plane scanlines to be processed based on the intersection boundary, is operable to:
find a first reformatting plane scanline sample and volume intersection;
check an intersection status of the next adjacent reformatting plane scanline;
if the next reformatting plane scanline sample is inside a volume object, then find the next sample intersection by searching in a direction away from the object; and
if the next reformatting plane scanline sample is not inside the volume object, then find the next intersection by searching in a direction towards the object.

20. A system of processing images having an input volume and one or more reformatting planes, comprising:
one or more processors;
memory in communication with the one or more processors;
application software operable on the one or more processors, the application software:

determining an intersection boundary between the input volume and the one or more reformatting planes;

determining one or more scanlines to be processed based on the intersection boundary;

selecting a traversal pattern from a plurality of traversal patterns based on an alignment between the input volume and the one or more planes;

processing the volume in accordance with the traversal pattern to generate an output image; and wherein the application software, when determining the one or more reformatting plane scanlines to be processed based on the intersection boundary, is operable to:

find a first reformatting plane scanline sample and volume intersection;

check an intersection status of the next adjacent reformatting plane scanline;

if the next reformatting plane scanline sample is inside a volume object, then find the next sample intersection by searching in a direction away from the object; and if the next reformatting plane scanline sample is not inside the volume object, then find the next intersection by searching in a direction towards the object.

* * * * *